United States Patent Office 3,068,197
Patented Dec. 11, 1962

3,068,197
RUBBERY POLYMER AND PROCESS
Albert L. Rocklin, Walnut Creek, Calif., assignor to Shell Oil Company, New York, N.Y., a corporation of Delaware
No Drawing. Filed Nov. 29, 1960, Ser. No. 72,297
6 Claims. (Cl. 260—45.85)

This invention relates to improved elastomers and processes for producing them. More particularly, it relates to methods for the production of colorless, stabilized, synthetic elastomers and methods for their recovery from hyprocarbon solutions.

It is known that conjugated dienes can be polymerized to produce elastomers having a high content of the cis-1,4 addition product. Particularly useful cis-1,4 addition products are those prepared from isoprene and from butadiene since the feed monomers are readily available and the polymers have properties that make them particularly suitable for the manufacture of automobile tires and other applications where natural rubber has been used heretofore. Methods for producing cis-1,4 addition products from conjugated dienes are well known and need to be indicated here only briefly.

A particularly useful method for producing cis-1,4 polyisoprene is to polymerize isoprene with any of a variety of hydrocarbyl lithium catalysts. Particularly preferred are alkyl lithiums such as n-butyl lithium, n-amyl lithium and other alkyl lithiums having from 2 to 10 carbon atoms. Such polymerizations are conducted at temperatures ranging from about 25° C. to about 100° C., generally at relatively loy superatmospheric pressures, e.g., the autogenic pressure of the system. The quantity of catalyst employed may be as low as 0.03 millimole per mol of isoprene or as high as 2 millimoles per mol of isoprene.

Polybutadiene having a high cis-1,4 addition content is suitably prepared with a catalyst that is the reaction product of a transition metal compound, particularly a halide, of a group IV to group VIII metal and a reducing agent. Titanium, zirconium, cobalt and nickel are particularly suitable transition metals. Suitable reducing agents are organo-metallic compounds of group I to III metals. Organo-aluminum compounds are particularly preferred reducing agents.

Another class of highly useful elastomers are the copolymers of ethylene and propylene which are produced by copolymerizing a mixture of the monomers with a catalyst comprising the reaction product of vanadium oxychloride and a reducing agent of the type previously described, or with a similar catalyst.

The polymerization conditions for polybutadiene and for ethylene-propylene copolymer are in general in the same range as those described for polyisoprene, although ethylene-propylene polymer can also be produced at higher pressures than employed for making polyisoprene.

The preparation of high quality elastomers from butadiene or ethylene and propylene presents similar problems to those faced in the production of polyisoprene. The present invention teaches a method of overcoming problems associated with product stabilization. It will be understood, however, that since polyisoprene, polybutadiene and ethylene-propylene copolymer are usually produced under conditions which differ somewhat from each other and with catalysts which differ from each other, the results obtains by utilizing a particular species of the invention may vary, depending upon which polymer is being produced.

The elastomers are produced under conditions that substantially exclude atmospheric impurities, particularly oxygen and water. Impurities such as sulfur, sulfur-containing compounds, oxygen-containing compounds and the like are also substantially excluded to assure obtaining a polymer that has properties which make it useful as a rubber.

The polymerizations are conducted in the presence of liquid inert diluents such as isopentane, hexane, gasoline, benzene, toluene and the like, which act as solvents for the polymer. Halogenated hydrocarbons may also sometimes be used. As the polymerization proceeds the elastomer forms and remains in solution until it is to be recovered.

It is well known that, like other organic materials, elastomers tend to undergo oxidative deterioration. On exposure to the atmosphere, synthetic rubber may soften or harden, depending on the rubber and the precise conditions. Still more severe conditions conducive to oxidative deterioration are often found during the processing of raw rubber into manufactured rubber articles. It has, therefore, become the practice to incorporate into elastomers a small amount of one or more stabilizers which enable the elastomer to resist oxidative deterioration. Ideally, the stabilizers improve resistance to deterioration without impairing other useful properties of the elastomer.

A particularly useful method for incorporating stabilizers into synthetic rubbers has been found to be the method of adding stabilizer to the hydrocarbon solution of rubber, the so-called cement, before the solid rubber is recovered therefrom.

It has now been found in studies directed to the production of polyisoprene having commerically desirable properties that while stabilizers known to the prior art, when added to polyisoprene rubber, provide satisfactory oxidation resistance their use is accompanied by disadvantages. A commercial stabilizer heretofore used, is a quite poisonous material which requires particularly careful handling during the manufacturing process and provides rubbers which may be undesirable for contact with foodstuffs. Another disadvantage of that stabilizer is that in the method of preparation heretofore employed the stabilized polyisoprene upon aging acquires a distinct red coloration, whereas it is generally desired to produce colorless or white rubbery product.

It is an object of this invention to provide improved processes for the recovery of stabilized elastomers from hydrocarbon solutions thereof. It is another object to provide a method for producing colorless or white stabilized elastomers having satisfactory oxidation resistance. It is a specific object to provide a method for preparing polyisoprene rubber of improved color. Other objects will become apparent from the following description of the invention.

It has been found that these objects can be accomplished according to this invention by a special method of incorporating in the elastomer as the oxidation inhibitor a 3,5-dialkyl-4-hydroxybenzyl alcohol. In accordance with this invention the alcohol is incorporated into the elastomer by being added to the solution of the elastomer prior to the recovery thereof, the solution also containing a small amount of a carboxylic acid. Certain preferred acids which lead to superior results are discussed below in more detail.

In a preferred modification of the method of preparation of the stabilized polymer, the coagulation of the rubber from hydrocarbon solution is carried out by contacting the hydrocarbon solution with a substantial body of hot water (liquid and/or steam) which is substantially free of heavy metal ions by virtue of having been either distilled or deionized. The method of coagulating by contact with hot water is described in more detail in copending patent application Serial No. 802,128, filed March 26, 1959, of D. B. Todd et al. The contact is preferably carried out by dispersing the elastomer solution by means of a stream of hot liquid water or of steam in a suitable nozzle. In the preferred embodiment, the effluent from said nozzle passes into a vessel partly filled with hot liquid water. The water temperatures are above the boiling point of the solvent present in the rubber cement, and sufficiently above the boiling point of the mixture of solvent and water to cause substantially complete evaporation of the solvent. Temperatures of the body of liquid water in said vessel are generally between 40° and 99° C. Temperatures are selected based on the solvent present and may be kept low, e.g. by use of reduced pressure, where the product is sensitive to treating temperatures. Temperatures from 40° to 70° C. are preferred in such cases.

The stabilizers which are used in accordance with this invention are of a class of materials which have only recently been discovered to be excellent oxidation inhibitors. As as class, the stabilizers are 3,5-dialkyl-4-hydroxybenzyl alcohols. They have the structure

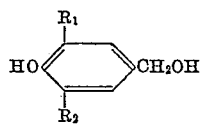

wherein $R_1$ and $R_2$ are alkyl radicals which may be the same or different. Representative compounds include 3,5-dimethyl-4-hydroxybenzyl alcohol, 3-methyl-5-ethyl-4-hydroxybenzyl alcohol, 3-ethyl-5-propyl-4 - hydroxybenzyl alcohol and 3-methyl-5-hexyl-4-hydroxybenzyl alcohol. The antioxidant properties of the hydroxybenzyl alcohols improve as the phenolic hydroxyl group becomes more hindered. Therefore the preferred hydroxybenzyl alcohols are those having at least one relatively large, and preferably branched alkyl substituent of the benzyl nucleus ortho to the hydroxyl group. Of these, the alkyl radicals having from 3 to 8 carbon atoms are most preferred. The alkyl radical may be aliphatic or cycloaliphatic. Suitable alkyl radicals include secondary alkyl radicals, e.g., isopropyl, sec-butyl, sec-amyl, sec-hexyl and cyclohexyl; and tertiary alkyl radicals, e.g., tert.butyl, tert.amyl, tert.hexyl, tert.octyl and 1-methylcyclohexyl. Representative hydroxy benzyl alcohols having one branched group are 3-isopropyl-5-methyl-4-hydroxybenzyl alcohol, 3-tert.butyl-5-methyl-4-hydroxybenzyl alcohol, 3-sec-butyl-5-ethyl-4-hydroxybenzyl alcohol and 3-sec-amyl-5-propyl-4-hydroxybenzyl alcohol. Typical hydroxybenzyl alcohols having two branched groups ortho to the phenolic hydroxyl are 3,5-diisopropyl-4-hydroxybenzyl alcohol, 3-isopropyl-5-tert.butyl-4-hydroxybenzyl alcohol, 3,5-ditert.butyl-4-hydroxybenzyl alcohol, 3,5-tert.amyl-4-hydroxybenzyl alcohol; and 3-tert.amyl-5-cyclohexyl-4-hydroxybenzyl alcohol.

Some members of these alcohols are low melting materials liquid at room temperature while others, depending on the size and type of substituents, are white crystalline solids. They are relatively insoluble in water, somewhat soluble in paraffins and aromatic liquids and soluble in oxygenated organic liquids such as alcohols and ethers.

In the process according to this invention a carboxylic acid is incorporated into a solution of an elastomer. Particularly preferred acids are those having a low molecular weight per carboxyl group. Especially preferred are hydroxy carboxylic acids which also have the capacity of complexing with heavy metal ions. A particularly preferred acid is citric acid. Other preferred acids are tartaric acid, oxalic acid, glycolic acid and lactic acid. Ethylene diamine tetraacetic acid may be used for the same purpose.

Carboxylic acids which do not have hydroxyl groups may also be suitably employed. Preferred are those having a relatively low molecular weight, e.g., acetic acid, propionic acid, butyric acid and the like. Suitable acids of intermediate molecular weight include adipic, benzoic and phthalic acid. It is sometimes desirable, however, for purposes other than those in connection with stabilization, to include higher molecular weight carboxylic acids, e.g., naphthenic acids or stearic or other normally solid fatty acids, typically those having from 10 to 20 carbon atoms. These acids also serve the purpose of this invention but larger amounts may be required.

It is well known that water in the form in which it is normally available for industrial use contains metal ions in substantial concentrations. It has been found that when such water is employed as coagulating medium for elastomer such as polyisoprene with the above-described stabilizing agents the resulting rubbers tend to have a noticeably strong yellow color. It is found that when, instead of the normally available water, a portion of water is used which has been distilled or which has been deionized, then the rubber produced is completely colorless or white, provided the solution of the elastomer contains an acid as well as the 3,5-dialkyl-4-hydroxybenzyl alcohol stabilizer. Methods for distilling or deionizing water are well known and need not be described here.

Ion concentrations which are typical for industrial water, distilled water, and deionized water are given in Table 1 below.

TABLE 1

| Element | Industrial water | Distilled water | Deionized water |
|---|---|---|---|
| Si | 9.7 | 8.1 | 0.3 |
| Ca | 64 | 1.6 | 0.12 |
| Fe | 0.59 | 0.65 | 0.17 |
| Mg | 21 | 0.26 | 0.022 |
| Zn | | | 0.061 |
| B | 0.47 | | 0.004 |
| Mn | | | 0.002 |
| Pb | | | <0.03 |
| Al | 0.11 | | 0.05 |
| Cu | 0.039 | 1.1 | 0.0024 |
| Na | 89 | | <0.03 |
| Ti | 0.019 | | 0.0018 |
| Ni | 0.019 | | 0.001 |
| Cr | 0.0029 | | 0.0021 |
| K | 15 | | |
| Mo | 0.038 | | |
| Li | 0.05 | | |
| Ag | 0.011 | | |
| Sr | 1.6 | | |
| Other | Nil | Nil | Nil |

The method of producing stabilized elastomers according to this invention, therefore, comprises polymerizing isoprene, butadiene or a mixture of ethylene and propylene in solution, recovering a solution of elastomer, adding to said solution a small amount of carboxylic acid and a small, oxidation-inhibiting amount of a 3,5-dialkyl-4-hydroxybenzyl alcohol, dispersing the hydrocarbon solution in hot deionized or distilled water to produce a coagulated rubber crumb and recovering a crumb which even upon prolonged storage remains white or colorless.

When the polymerization catalyst contains compounds of one or more metals other than alkali metals, it is desirable to remove the catalyst residue from the reaction mixture before the rubber is coagulated. Such catalyst removal steps are known to the art. For example, the hydrocarbon solution of polymer may be contacted in one or more washes with an alcohol such as methyl, ethyl, isopropyl or a butyl alcohol or with water. Preferably the wash solutions contain an acid, susch as hydrogen chloride.

In general, very small amounts of the stabilizer and of the acid are required to obtain beneficial stabilizing results. For example, a suitable range of stabilizer is between 0.01 and 5 parts per 100 parts of rubber (phr.). The range between 0.1 and 2 phr. is preferred and best results are generally obtained with from .25 to 1 phr. of the 3,5-dialkyl-4-hydroxybenzyl alcohol.

The amount of acid added to the elastomer solution is influenced by the type of acid, particularly by the molecular weight per carboxyl group. It is desirable to have an amount of acid which is lower than that which can react completely with the hydroxybenzyl alcohol to form the corresponding ester, i.e., less than a chemically equivalent amount. Thus, the amount of citric acid which is employed should be less than 0.4 part per part by weight of 3,5-ditert-butyl-4-hydroxybenzyl alcohol and the amount of stearic acid employed with the same inhibitor may be up to about 1.2 parts per part by weight. Any amount of acid in this range provides some improvement in results. It is preferred to use at least 0.05 part of acid. The acid need not be soluble in the hydrocarbon solution, so long as it is thoroughly dispersed by suitable agitation. The acid may be added in solution in a suitable mutual solvent, e.g., tert-butyl alcohol or the like.

The invention is illustrated in greater detail in the following examples. The examples are merely illustrative and are not to be regarded as limitations on the appended claims, since the teachings of the examples may be varied as will be understood by one skilled in the art. In the examples as well as throughout the specification parts and percentages are by weight unless otherwise indicated.

Example 1

A solution of cis-1,4-polyisoprene is prepared by charging a polymerization vessel with commercial isopentane (95% isopentane and 5% n-pentane) and with 2,080 pounds of isoprene. Isoprene constitutes 16.5% of the total charge. Thereafter 0.4 lb. of n-butyl lithium is added to the reactor and continuous agitation is maintained. The polymerization vessel is closed to the atmosphere and the several materials are charged in such a manner that they do not come into contact with air. After catalyst addition, polymerization of isoprene begins and causes a temperature rise from atmospheric temperature to about 55–65° C. The pressure developed in the reactor reaches about 32 p.s.i.g. After about 1⅓ hours the polymerization is complete. The completion may be tested by withdrawing a sample and coagulating it by mixing with isopropanol. The coagulated elastomer contains about 92% cis-1,4 addition product and has an intrinsic viscosity of 7.4 dl./g. measured in toluene at 25° C. By the coagulation of a sample it is determined that the solids content of the polymer in solution is 16.5% by weight. There is now added to the solution a sufficient portion of a 17% solution of stearic acid in isopentane to provide 1 phr. of stearic acid. One phr. of 3,5-ditert-butyl-4-hydroxybenzyl alcohol is also added. The mixture is thoroughly blended for a few hours to provide homogeneity. Thereafter the elastomer is coagulated by feeding the elastomer solution into a vessel containing hot deionized water at 70° C. The solid cis-1,4 polyisoprene floats to the top of the vessel and is recovered as crumbs of discrete particles which are substantially tack free. The polymer crumbs are then dried at 80° C. for 60–90 minutes and a dry crumb is recovered which retains only about 0.2% of volatile liquid consisting mainly of water.

The recovered crumb has a snow-white appearance. Polyisoprene rubber prepared therefrom is clear and uncolored and remains uncolored even on prolonged storage.

Example 2

Example 1 is repeated with the difference that in lieu of stearic acid there is added sufficient of a solution of citric acid in tertiary butyl alcohol to provide 0.05 phr. of citric acid. A lesser amount of 3,5-ditert-butyl-4-hydroxybenzyl alcohol is added, namely 0.3 phr. The product is a white crumb of polyisoprene which can be converted into a colorless polyisoprene rubber.

Example 3

The procedure of Example 1 is repeated but the addition of stearic acid is omitted and the water employed is ordinary city water containing a significant amount of heavy metal ions.

It is found that the polyisoprene produced is resistant against oxidation but the color of the rubber upon storage, e.g., for 1½ hours at 80° C., is yellow.

Example 4

When distilled water is substituted for city water in Example 3 the color of the rubber is bright yellow.

Example 5

It is further found that addition of citric acid to the city water in Example 3 causes a slight improvement in the color. The color of rubber produced in this manner is pale yellow compared to the yellow color when citric acid is not employed.

Example 6

The procedure of Example 1 is modified by using in lieu of deionized water ordinary city water having added thereto 1% citric acid. The color of the resulting rubber is off-white.

Example 7

When substituting ordinary city water without addition of citric acid in the procedure of Example 1 the color of the resulting rubber is faint yellow.

Example 8

The procedure of Example 1 is repeated on a smaller scale except that the organic acid is palmitic acid. In this case substantially the same results are obtained.

Example 9

The procedure of Example 1 is repeated on a smaller scale except that the acid employed is a modified form of oleic acid which is identified as Emery Industries Acid No. 997–S. It is found that the results are essentially the same with the modified oleic acid as with stearic acid.

Example 10

Cis-1,4 polybutadiene, as a solution in benzene, is prepared by polymerizing a saturated solution of butadiene in benzene with a catalyst consisting of the reaction product of titanium trichloride and aluminum diethyl chloride in a mol ratio of 2.5:1. After polymerization is completed the catalyst is killed and catalyst residue removed by contact with HCl-containing alcohol and water in succession.

A stearic acid solution is prepared in benzene and is blended into the washed polybutadiene solution in an amount on the order of 1% by weight of the polybutadiene. One phr. of 3,5-ditert-butyl-4-hydroxybenzyl alcohol is also added. The rubber is recovered by coagulation in deionized water and drying at 82° C. for 90 minutes. It is tack free and contains about 0.1% water and only a trace of benzene. Because benzene has a higher boiling point than the solvents of the previous examples hot water used for the coagulation of the elastomer is at a temperature in the range from 93–98° C. The residence time of the crumb in the hot water vessel is also longer. The rubber produced according to this example is white and does not become colored on storage.

Example 11

A solution of an amorphous copolymer of ethylene and propylene in heptane is prepared. To a 5-liter vessel 1 liter of dry oxygen-free heptane and 1 millimole of triisobutyl aluminum are charged. The heptane is then saturated with a mixture of ethylene and propylene by bubbling a mixture of the gases through the heptane. The mixed gases are in a mol ratio of ethylene to propylene of 1:2.5. Thereafter 0.3 millimole of vanadium tetrachloride is added and this initiates the polymerization. The various components are charged under conditions that permit no contact with the atmosphere, and polymerization is carried out with constant agitation. There is a slight temperature rise due to exothermicity and the polymerization temperature rises to 50° C.

After about 30 minutes the catalyst is killed and the polymer solution is recovered by the same procedure as described in Example 10. Although the solvents are different, substantially the same results are obtained. The ethylene-propylene copolymer is recovered as a crumb of discrete particles containing about 50% polymerized ethylene and stable against oxidation without discoloration upon storage.

I claim as my invention:

1. The process for recovering colorless solid rubbery hydrocarbon polymer from hydrocarbon solution comprising blending with the hydrocarbon solution of polymer from 0.01 to 5 parts of a 3,5-dialkyl-4-hydroxybenzyl alcohol per hundred parts of polymer and an acid in an amount less than the equivalent of said alcohol dispersing said solution in an aqueous medium substantially free of metal ions at a temperature above the boiling point of the mixture of the hydrocarbon solvent and water at the process pressure, and recovering crumbs of polymer capable of being milled to form a substantially colorless, clear rubber.

2. The process according to claim 1 in which said elastomer is synthetic polyisoprene.

3. The process according to claim 1 in which said 3,5-dialkyl-4-hydroxybenzyl alcohol is 3,5-ditert-butyl-4-hydroxybenzyl alcohol.

4. The process according to claim 1 in which said acid is citric acid.

5. The process according to claim 1 in which said aqueous medium is distilled water.

6. The process according to claim 1 in which said aqueous medium is deionized water.

No references cited.